(12) United States Patent
Levinshtein et al.

(10) Patent No.: US 12,210,587 B2
(45) Date of Patent: Jan. 28, 2025

(54) UNSUPERVISED SUPER-RESOLUTION TRAINING DATA CONSTRUCTION

(71) Applicant: SAMSUNG ELECTRONICS CO., LTD., Suwon-si (KR)

(72) Inventors: Aleksai Levinshtein, Ontario (CA); Xinyu Sun, Toronto (CA); Haicheng Wang, Toronto (CA); Vineeth Subrahmanya Bhaskara, Toronto (CA); Stavros Tsogkas, Toronto (CA); Allan Jepson, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 523 days.

(21) Appl. No.: 17/512,312

(22) Filed: Oct. 27, 2021

(65) Prior Publication Data

US 2022/0138500 A1 May 5, 2022

Related U.S. Application Data

(60) Provisional application No. 63/113,368, filed on Nov. 13, 2020, provisional application No. 63/107,801, filed on Oct. 30, 2020.

(51) Int. Cl.
*G06F 18/214* (2023.01)
*G06N 3/045* (2023.01)
(Continued)

(52) U.S. Cl.
CPC ......... *G06F 18/2148* (2023.01); *G06N 3/045* (2023.01); *G06N 3/088* (2013.01);
(Continued)

(58) Field of Classification Search
None
See application file for complete search history.

(56) References Cited

U.S. PATENT DOCUMENTS 9,349,164 B2 5/2016 Wang et al.
9,836,820 B2 12/2017 Tuzel et al.
(Continued)

FOREIGN PATENT DOCUMENTS

JP 6611107 B 11/2019
KR 10-2021-0090159 A 7/2021
(Continued)

OTHER PUBLICATIONS

Y. Yuan, S. Liu, J. Zhang, Y. Zhang, C. Dong and L. Lin, "Unsupervised Image Super-Resolution Using Cycle-in-Cycle Generative Adversarial Networks," 2018 IEEE/CVF Conference on Computer Vision and Pattern Recognition Workshops (CVPRW), Salt Lake City, Ut, USA, 2018, pp. 814-81409, (Year: 2018).*
(Continued)

*Primary Examiner* — Andrae S Allison
(74) *Attorney, Agent, or Firm* — Sughrue Mion, PLLC

(57) ABSTRACT

A method for training a super-resolution network may include obtaining a low resolution image; generating, using a first machine learning model, a first high resolution image based on the low resolution image; generating, using a second machine learning model, a second high resolution image based on the first high resolution image and an unpaired dataset of high resolution images; obtaining a training data set using the low resolution image and the second high resolution image; and training the super-resolution network using the training data set.

11 Claims, 4 Drawing Sheets

(51) Int. Cl.
　　　*G06N 3/088*　　(2023.01)
　　　*G06T 3/4053*　　(2024.01)
　　　*G06T 5/20*　　(2006.01)

(52) U.S. Cl.
　　　CPC ............. *G06T 3/4053* (2013.01); *G06T 5/20* (2013.01); *G06T 2207/20081* (2013.01)

(56) References Cited

U.S. PATENT DOCUMENTS

| | | | |
|---|---|---|---|
| 11,232,541 | B2 | 1/2022 | Wang et al. |
| 11,373,274 | B1* | 6/2022 | Yoon .................... G06T 3/4053 |
| 11,763,544 | B2* | 9/2023 | Zhao ...................... G06N 3/045 382/157 |
| 11,790,502 | B2* | 10/2023 | Chen .................... G06T 3/4053 |
| 2018/0068430 | A1 | 3/2018 | Sang et al. |
| 2018/0075581 | A1* | 3/2018 | Shi ......................... G06N 3/045 |
| 2019/0333219 | A1* | 10/2019 | Xu ........................ G06N 3/045 |
| 2020/0111194 | A1 | 4/2020 | Wang et al. |
| 2021/0192286 | A1* | 6/2021 | Liou ............ G06T 5/20 |
| 2022/0005157 | A1 | 1/2022 | Shu et al. |
| 2022/0138500 | A1* | 5/2022 | Levinshtein .......... G06V 10/82 382/159 |
| 2023/0146181 | A1* | 5/2023 | Meshkin .................. G06N 3/04 382/274 |
| 2023/0214664 | A1* | 7/2023 | Kudo ..................... G06N 3/094 382/155 |

FOREIGN PATENT DOCUMENTS

| | | |
|---|---|---|
| KR | 10-2021-0116922 A | 9/2021 |
| WO | 2019/220095 A1 | 11/2019 |

OTHER PUBLICATIONS

Reda, Fitsum A., et al. "Sdc-net: Video prediction using spatially-displaced convolution." Proceedings of the European conference on computer vision (ECCV). 2018. (Year: 2018).*

Lee, S., et al., "Generation and Evaluation of Unpaired Near-Infrared Face Images Using CycleGAN", Journal of Digital Contents Society, vol. 21, No. 3, Mar. 2020, pp. 593-600.

Wang et al., "ESRGAN: Enhanced Super-Resolution Generative Adversarial Networks", 2018, ECCV, 16 pages total.

Ji, et al., "Real-World Super-Resolution via Kernel Estimation and Noise Injection", 2020, CVPRW, 10 pages total.

Zhou, ett al., "Kernel Modeling Super-Resolution on Real Low-Resolution Images", 2019, IEEE/ICCV, 12 pages total.

Ulyanov, et al., "Deep Image Prior", 2017, Cornell University, 25 pages total.

Search Report (PCT/ISA/210) issued Feb. 9, 2022 by the International Searching Authority in International Patent Application No. PCT/KR2021/015450.

Written Opinion (PCT/ISA/237) issued Feb. 9, 2022 by the International Searching Authority in International Patent Application No. PCT/KR2021/015450.

\* cited by examiner

UNSUPERVISED SUPER-RESOLUTION TRAINING DATA CONSTRUCTION

CROSS-REFERENCE TO RELATED APPLICATION(S)

This application is based on and claims priority under 35 U.S.C. § 119 to U.S. Provisional Patent Application Nos. 63/107,801 and 63/113,368, filed on Oct. 30, 2020 and Nov. 13, 2020, respectively, in the U.S. Patent & Trademark Office, the disclosure of which is incorporated by reference herein in its entirety.

BACKGROUND

1. Field

The disclosure relates to a device and method for training a super-resolution network, and relates to a device and method for performing super-resolution imaging using the trained super-resolution network.

2. Description of Related Art

Super-resolution is the task of increasing the spatial resolution of an input image (or video), and producing a result that is perceptually plausible and faithful to the content of the original image. As the amount of visual content has increased dramatically over the past decade, so has the interest in improving its quality. Today, super-resolution has numerous applications such as driving the digital zoom in mobile phones, improving the quality of streaming content for teleconferencing and entertainment, enhancing the photos shared on social media, and even boosting the capabilities of surveillance and medical imaging.

Deep learning has been the state-of-the-art in super-resolution in recent years. The dominant approach obtains paired training data through synthetic down-sampling of high-resolution images, and trains a model in a supervised fashion. The domain gap between these synthetically generated, low-resolution images used during training, and the real images encountered at test time, results in subpar results and poor generalization. This is true even when synthetic data generation techniques explicitly try to reduce this domain gap.

The dominant super-resolution paradigm currently relies on the following supervised learning scheme: given a set of corresponding pairs of low-resolution and high-resolution images, learn a function that maps an image of the former domain to the latter. The function itself is often modeled as a convolutional neural network (CNN), but, generally, it may comprise a combination of convolutional modules, with varying connectivity patterns, architectural designs, and loss objectives. More sophisticated models employ residual networks, dense connections, attention, or generative adversarial networks (GANs).

The low-resolution and high-resolution pairs are typically obtained by applying a strided convolution with a separable bicubic kernel, on a collection of high-quality images, to obtain the corresponding low-resolution images. Although this simple scheme facilitates the collection of large datasets, necessary for training deep neural networks, it has two major limitations: the blur kernel representing the degradation process from high-resolution to low-resolution is fixed for all pairs; and it does not represent the actual degradations that are introduced when a camera captures a real scene to generate a photograph. As a result, even state-of-the-art models perform noticeably worse when tested on novel "real world" images.

SUMMARY

According to an aspect of an example embodiment, a method for training a super-resolution network may include obtaining a low resolution image; generating, using a first machine learning model, a first high resolution image based on the low resolution image; generating, using a second machine learning model, a second high resolution image based on the first high resolution image and an unpaired dataset of high resolution images; obtaining a training data set using the low resolution image and the second high resolution image; and training the super-resolution network using the training data set.

A method for performing super-resolution imaging by an electronic device may include obtaining, using a camera of the electronic device, a low resolution image; inputting the low resolution image into a trained super-resolution network; obtaining a high resolution image from the trained super-resolution network; and providing the high resolution image for display. The trained super-resolution network may be trained based on a training data set generated partially by: obtaining a low resolution image; generating, using a first machine learning model, a first high resolution image based on the low resolution image; generating, using a second machine learning model, a second high resolution image based on the first high resolution image and an unpaired dataset of high resolution images; and obtaining the training data set using the low resolution image and the second high resolution image.

According to an aspect of an example embodiment, a device for training a super-resolution network may include a memory configured to store instructions; and a processor configured to execute the instructions to: obtain a low resolution image; generate, using a first machine learning model, a first high resolution image based on the low resolution image; generate, using a second machine learning model, a second high resolution image based on the first high resolution image and an unpaired dataset of high resolution images; obtain a training data set using the low resolution image and the second high resolution image; and train the super-resolution network using the training data set.

The generating the first high resolution image may include generating the first high resolution image by minimizing an image loss function and a kernel loss function.

The generating the first high resolution image may include generating the first high resolution image by identifying a blur kernel.

The generating the second high resolution image may include generating the second high resolution image by training a generator that performs domain adaptation between the first high resolution image generated by the first machine learning model and a real high resolution image.

The generating the second high resolution image may include generating the second high resolution image by minimizing an adversarial loss, a cycle loss, and a low-frequency content preservation loss that is defined as a distance between an input and an output of the second machine learning model after passing the input and the output through a low-pass filter.

The training of the super-resolution network may include training the super-resolution network to obtain an input low resolution image captured by a user device, and output a high resolution image.

The example embodiments provide a multi-stage super-resolution approach that synthesizes high-quality pseudo-ground truth data, and uses it to train a super-resolution model in a supervised fashion. Doing so allows the bypass of the domain gap between training and test input images, which hurts the performance of methods that use only synthetic low-resolution data during training. By avoiding the creation of an input domain gap, the example embodiments provide better generalization to new input images, and improved quantitative and qualitative results compared to related state-of-the-art real super-resolution approaches.

The example embodiments utilize low resolution images that are real in both training and test time. In this way, the example embodiments avoid the introduction of a domain gap in the input to the network. This is the advantage of having synthetic high resolution data instead of synthetic low resolution data. The example embodiments also avoids the disadvantage of using synthetic high resolution data, which is that it is of a worse quality than real high resolution data. Moreover, the example embodiments employs synthetic high resolution data in a fashion that avoids its disadvantage, which is that it is of a worse quality than real high resolution data.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
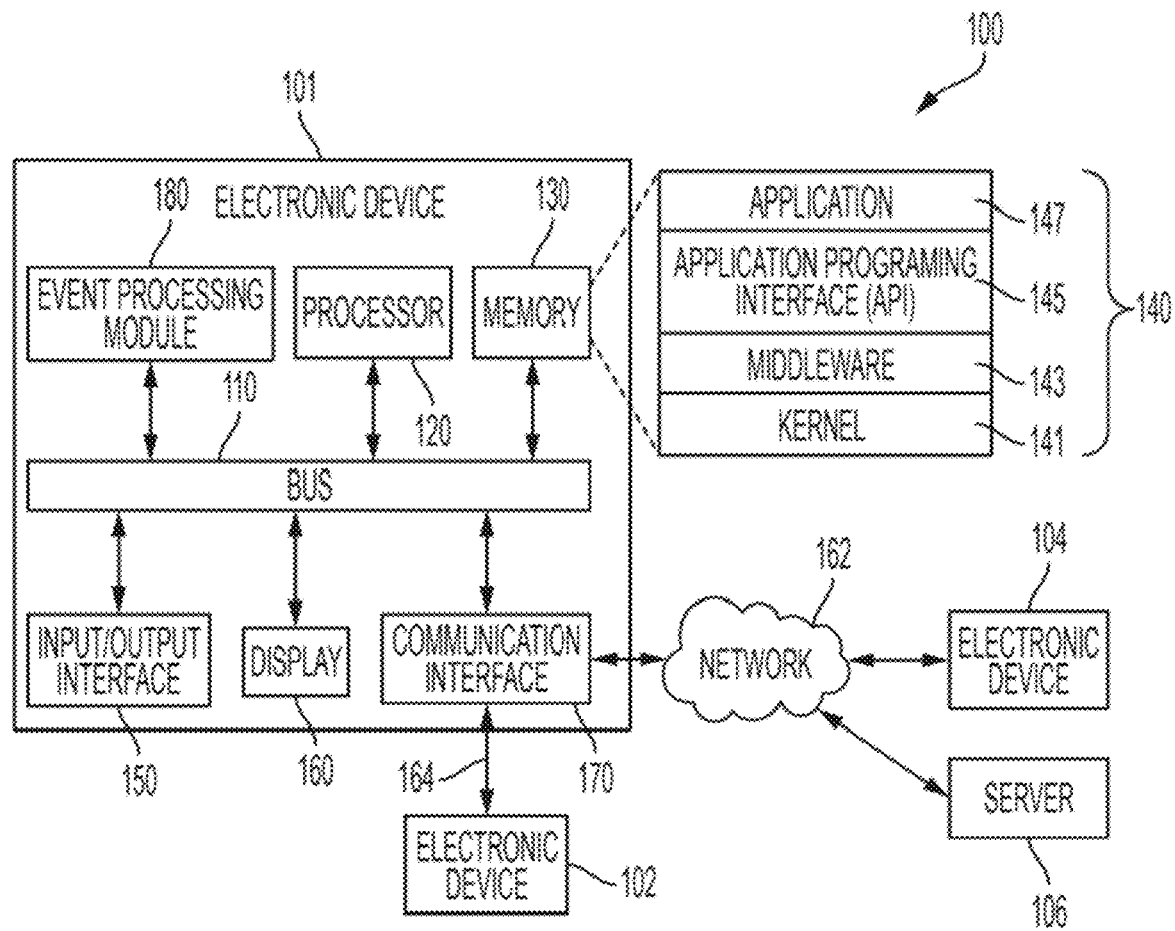
FIG. 1 is a diagram of an environment according to an example embodiment.

FIG. 1 is a diagram of an environment according to an example embodiment.

Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 may detect the mounting in the HMD and operate in a virtual reality mode. When the electronic device 101 is mounted in the electronic device 102 (e.g., the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, 5G, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present disclosure.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present disclosure in interoperation with at least one program 140 stored in the memory 130.

Figure 2:
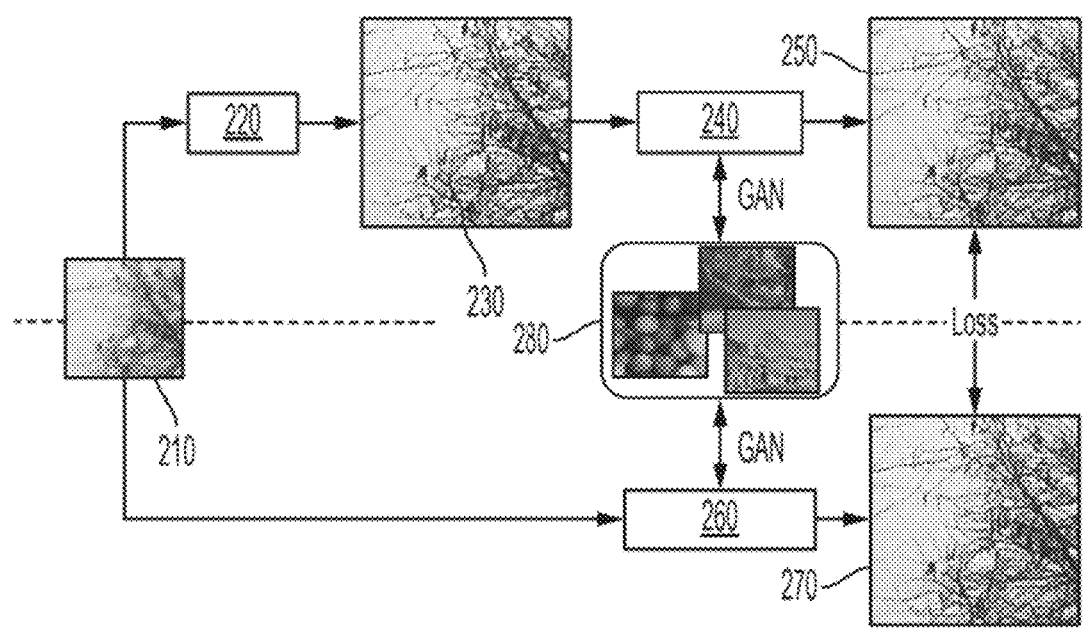
FIG. 2 is a diagram of generating training data and training a super-resolution network.

FIG. 2 is a diagram of generating training data and training a super-resolution network. The operations shown in FIG. 2 may be performed by one or more the electronic device 101 or the server 106.

As shown in FIG. 2, the method for training a super-resolution network 260 may include obtaining a low resolution image 210, generating, using a first machine learning model 220, a first high resolution image 230 based on the low resolution image 210. According to an example embodiment, the first machine learning model 220 may use a blind super-resolution method to generate the first high resolution image 230. A blind super-resolution process may attempt to infer the unknown blur and downscaling kernel that has produced a given low-resolution (LR) image, and use it to reconstruct its high-resolution version.

According to another example embodiment, the first machine learning model 220 may use blind super-resolution with iterative kernel correction method.

According to yet another example embodiment, the first machine learning model may first estimate a kernel using a KernelGAN method. The model may then use the estimated kernel in any online optimization method for super-resolution, such as a direct optimization method, a blind super-resolution kernel estimation method using an internal GAN, or a super-resolution method using deep leaning which trains a small image-specific CNN at test time on examples extracted solely from the input image itself.

Further, the method may include generating, using a second machine learning model 240, a second high resolution image 250 based on the first high resolution image 230 and an unpaired dataset of high resolution images 280.

According to an example embodiment, the second machine learning model 240 may be a domain adaptation module configured to obtain synthetic high resolution images and make them look like real high resolution images. According to an example embodiment, the second machine learning model may use a CycleGAN method for general domain transfer where two generators are trained and a cycle consistency loss is enforced.

Further still, the method may include obtaining a training data set using the low resolution image 210 and the second high resolution image 250; and training the super-resolution network 260 using the training data set. In this way, the super resolution network 260 may generate a high resolution image 270 that is substantially similar to the second high resolution image 250 based on being trained.

Accordingly, the trained super-resolution network 260 may be implemented in an electronic device (e.g., a smartphone) to permit the electronic device to perform super-resolution.

The method shown in FIG. 2 is described in more detail below. The method may include obtaining a set of low-resolution images, and the set of low-resolution images may be represented as:

$$X=\{x_i\}_{i=1}^{N}$$

The method may include obtaining a set of high-resolution images, and the set of high-resolution images may be represented as:

$$Y=\{y_i\}_{i=1}^{M}$$

As shown below, W denotes the width of the low-resolution image, H denotes the height of the low-resolution image, and s is a scale factor.

$$x_i \in \mathbb{R}^{W \times H \times 3}$$

$$y_i \in \mathbb{R}^{sW \times sH \times 3}$$

The method may include learning the following mapping function which is modeled as the deep super-resolution network.

$$F: X \to Y$$

To train the mapping function F, the method includes generating a paired set of real low-resolution and synthetic high-resolution data:

$$(X, Y^S) = \{(x_i, y_i^S)\}_{i=1}^N$$

The method includes generating an initial version of synthetic high-resolution data:

$$\tilde{Y}^S = \{\tilde{y}_i^S\}_{i=1}^N$$

Then, the method includes applying a CycleGAN to refine the initial version of the high-resolution data, to obtain the synthetic high-resolution training data.

The method includes training the mapping function F of the super-resolution network in a supervised manner using the paired set:

$$(X, Y^S)$$

In this way, the present disclosure provides a model for unsupervised super-resolution that is free of the limitations described regarding the related art, and performs better than the related art under realistic conditions. In contrast to the related art, the embodiments of the present disclosure do not compute synthetically generated low-resolution images but rather operate in the high-resolution domain directly. Accordingly, the embodiments of the present disclosure can account not just for the unknown blur kernel, but for a multitude of different degradation factors, introduced by a camera system when taking a photograph. Second, the fact that the embodiments do not synthetically create low-resolution images eliminates an additional source of domain gap, that related art systems have to address. Third, because the example embodiments do not need to adapt to any image individually at test time, the embodiments are efficient, while still maintaining good generalization properties.

In this way, the example embodiments generate high-quality pseudo-groundtruth, removing the need for paired training data; explicitly avoid introducing a domain gap between real and synthetically generated low-resolution images; and outperform unpaired super-resolution alternatives, both quantitatively and qualitatively. For instance, the example embodiments are faster because the embodiments do not have to train a model on each image individually at test time, and are truly unsupervised and make no specific kernel assumptions. In this way, the example embodiments avoid any potential artifacts introduced by a domain gap between synthetically generated and real low-resolution images.

Figure 3:
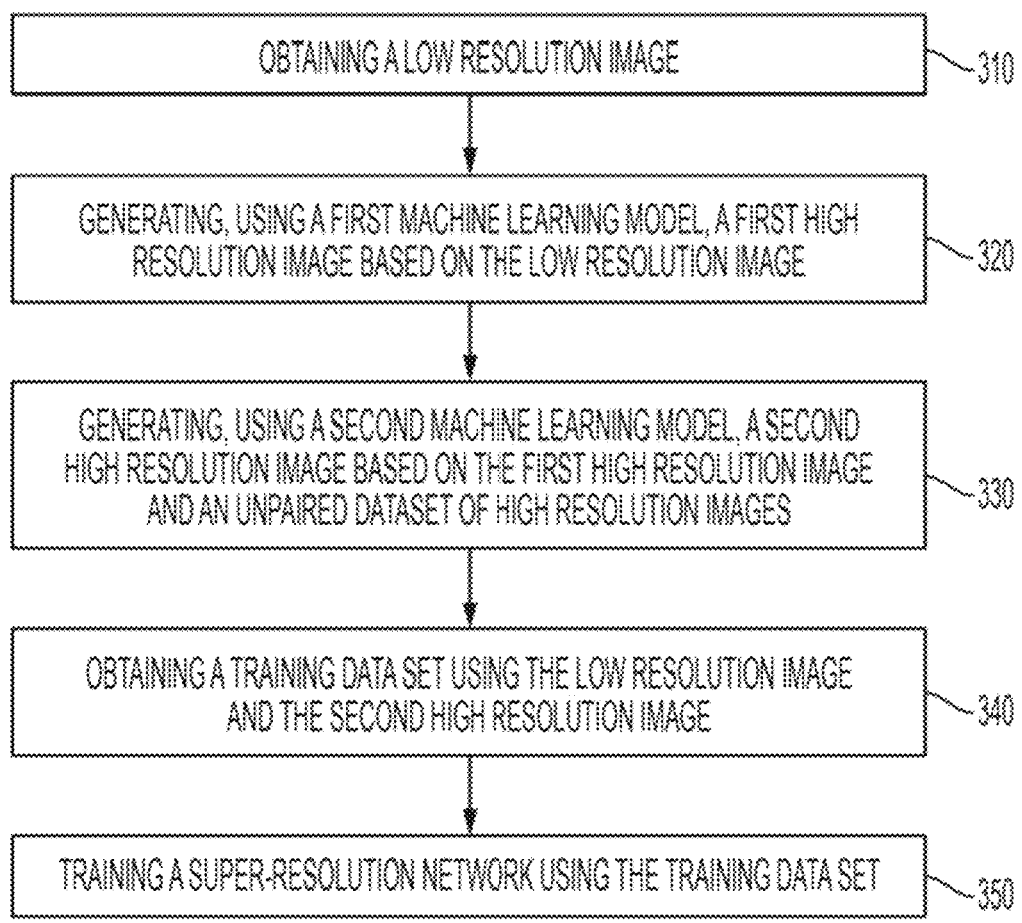
FIG. 3 is a flowchart of a method for training a super-resolution network.

FIG. 3 is a flowchart of a method for training a super-resolution network. The operations shown in FIG. 3 may be performed by one or more the electronic device 101 or the server 106.

As shown in FIG. 3, the process may include obtaining a low resolution image (operation 310), and generating, using a first machine learning model, a first high resolution image based on the low resolution image (operation 320).

Given a high-resolution image y, its degraded low-resolution version x may be modeled as:

$$x = (k * y) \downarrow_s + n$$

As shown above, k is the blur kernel, and n is the added noise.

Replacing y for the output of the first stage of the process, y can be recovered using Equation 1 shown below:

$$\tilde{y}^{S*} = \underset{\tilde{y}^S}{\operatorname{argmin}} \{ \|x - (k * \tilde{y}^S)\downarrow_s\|_1 + R(\tilde{y}^S) \}$$

As shown above, the first term is the L1 backprojection loss, and R is a regularization term. The former encourages consistency between the reconstructed high-resolution image and the low-resolution observation. The latter is beneficial in dealing with the ill-posed nature of the problem, as there are multiple high-resolution images whose downsampled versions would match x.

In some embodiments, the usage of a regularization term might not be necessary. For instance, $\tilde{y}^S = f_\theta^{DIP}(z)$, where $z \in \mathbb{R}^{sW \times sH \times C}$ is a random tensor, and $f_\theta^{DIP}$ is a generator network whose weights, $\theta$, are optimized for a particular range input.

An embodiment modifies deep image prior (DIP) by adding a total variation regularization term, with a small weight, which results in the following image loss function:

$$\mathcal{L}_I(x, k, \theta) = \|x - (k * f_\theta^{DIP}(z))\downarrow_s\|_1 + \alpha TV(f_\theta^{DIP}(z))$$

In a realistic super-resolution scenario, the kernel k is also unknown. An embodiment represents the kernel using a K×K matrix and includes it in the optimization, also adding the following kernel loss to further constrain the optimization:

$$\mathcal{L}_K(k) = \left\| 1 - \sum_{ij} k(i,j) \right\|_1 + \frac{1}{K} \left\| (x_c, y_c) - \frac{\sum_{ij}(k(i,j) \cdot (i,j))}{\sum_{ij} k(i,j)} \right\|_1$$

As shown above, $(x_c, y_c)$ denotes the center of the kernel mask. This encourages the kernel to sum to 1 and be properly centered.

The final objective for synthetic data generation is the combination of the image loss $\mathcal{L}_I$ and the kernel loss $\mathcal{L}_K$:

$$\mathcal{L}_S(x, k, \theta) = \mathcal{L}_I(x, k, \theta) + \beta \mathcal{L}_K(k)$$

The embodiments minimize $\mathcal{L}_S$ for each image $x_i$ in the low-resolution dataset, thereby obtaining the paired dataset represented below:

$$\{(x_i, \tilde{y}_i^S = f_{\theta_i}^{DIP}(z_i))\}_{i=1}^N$$

As further shown in FIG. 3, the process may include generating, using a second machine learning model, a second high resolution image based on the first high resolution image (operation 330) and an unpaired dataset of high resolution images, and obtaining a training data set using the low resolution image and the second high resolution image (operation 340).

The second machine learning model may be a domain adaptation module configured to obtain synthetic high resolution images and make them look like real high resolution images. In some embodiments, the second machine learning model may be a CycleGAN that constrains the input and output images to have the same low frequencies. However, in other embodiments, the second machine learning model may use other domain adaptation methods such as methods that match feature distributions in source and target domains, that reweigh or select samples from the source domain, that seek an explicit feature space transformation, that use discriminative classifiers, or the like.

In general, domain adaptation (also called domain translation) refers to a module that converts one type of data into another such as, for example, female faces to male faces, day images to night images, computer-generated graphics to real images, etc.

While DIP can produce a reasonably good high-resolution version of the low-resolution input image, DIP is still limited in the sense that its output is informed only by a single image. As a result, the generated images might not be sharp or "natural" enough to be used as pseudo-ground truth for training a neural network.

To further increase the quality of the synthetic data, the embodiments modify CycleGAN to train a generator $G_{\tilde{Y}Y}$ that performs domain adaptation between the spaces of synthetic DIP-generated images, $\tilde{Y}$, and real high-resolution images, $Y$.

An objective is to enhance the high frequencies in the output, making it look more natural, without changing the low frequency content. To that end, the embodiments add a low-frequency content preservation loss, $\mathcal{L}_{LF}$, defined as the L1 distance between the input and the output of the synthetic-to-real generator, after passing both through a low-pass filter:

$$\mathcal{L}_{LF} = \mathbb{E}_{\tilde{y} \sim P_{\tilde{Y}}}[\|G_{\tilde{Y}Y}(\tilde{y})*k_{DA} - \tilde{y}*k_{DA}\|_1]$$

As shown above, $k_{DA}$ is a Gaussian blue kernel with standard deviation $\sigma_{DA}$.

The final domain adaptation loss is provided as:

$$\mathcal{L}_{DA} = \mathcal{L}_{adv} + \lambda_{cyc}\mathcal{L}_{cyc} + \lambda_{LF}\mathcal{L}_{LF}$$

As shown above, $\mathcal{L}_{adv}$ is the adversarial loss, and $\mathcal{L}_{cyc}$ is the cycle loss.

Based on the CycleGAN architecture being trained, the embodiments apply $G_{\tilde{Y}Y}$ to the images generated by DIP, thereby obtaining a new paired dataset shown below:

$$\{(x_i, y_i^S = G_{\tilde{Y}Y}(\tilde{y}_i^S))\}_{i=1}^N$$

As further shown in FIG. 3, the process may include training the super-resolution network using the training data set (operation 350).

The super-resolution network may be represented as:

$$F: \mathbb{R}^{W \times H \times 3} \to \mathbb{R}^{sW \times sH \times 3}$$

To train the super-resolution network, the embodiments use a loss function represented as:

$$\mathcal{L}_F = \eta \mathcal{L}_{FID}^{LF} + \mathcal{L}_{PERC} + \gamma \mathcal{L}_{GAN}$$

The fidelity term may be modified to operate on low-frequency content, and may be represented as:

$$\mathcal{L}_{FID}^{LF} = \frac{1}{N}\sum_i \|y_i^S * k_{SR} - F(x_i)*k_{SR}\|_{L1}$$

The perceptual loss may be represented as:

$$\mathcal{L}_{PERC} = \frac{1}{N}\sum_i \|\Psi(y_i^S) - \Psi(F(x_i))\|_{L1}$$

The GAN loss may be represented as:

$$\mathcal{L}_{GAN}$$

The Gaussian blur kernel may be represented as:

$$k_{SR}$$

The Gaussian blur kernel may be represented as:

$$\sigma_{SR}$$

In order to reduce the effect of artifacts in the synthetic data on model quality, the embodiments use real HR images as the target domain when training the GAN discriminator, similar to the training of CycleGAN.

Figure 4:
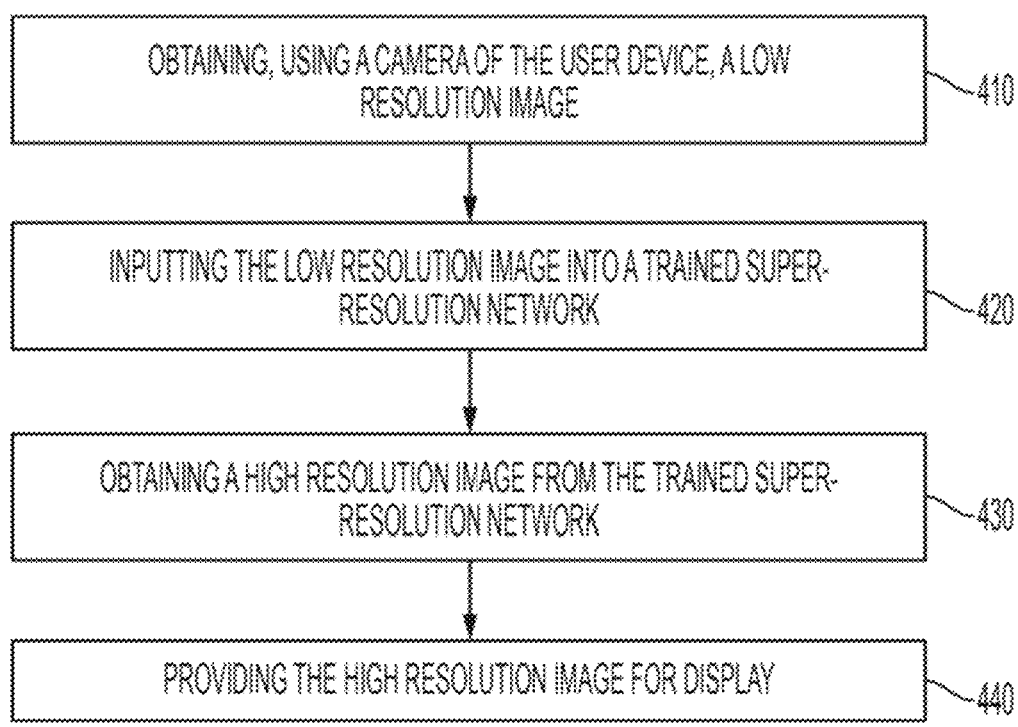
FIG. 4 is a flowchart of performing super-resolution imaging by an electronic device.

FIG. 4 is a flowchart of performing super-resolution imaging by an electronic device.

As shown in FIG. 4, the process may include obtaining, using a camera of the user device, a low resolution image (operation 410); inputting the low resolution image into a trained super-resolution network (operation 420); obtaining a high resolution image from the trained super-resolution network (operation 430); and providing the high resolution image for display (operation 440).

A method of performing super-resolution imaging according to an embodiment may generate a pseudo ground truth using blind super-resolution and domain adaptation, and therefore does not require an input of paired training data.

Related methods of image processing use an offline trained model on paired data (general super-resolution). As such, these general super-resolution methods require readily available paired training data. Further, general super-resolution methods that obtain paired training data using simple downscaling will provide low quality outputs when using real input data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for training a super-resolution network, the method comprising:
   obtaining a low resolution image;
   generating, using a first machine learning model, a first high resolution image based on the low resolution image;
   generating, using a second machine learning model, a second high resolution image based on the first high resolution image and an unpaired dataset of high resolution images, by minimizing an adversarial loss, a cycle loss, and a low-frequency content preservation loss that is defined as a distance between an input and an output of the second machine learning model after passing the input and the output through a low-pass filter;
   obtaining a training data set using the low resolution image and the second high resolution image; and
   training the super-resolution network using the training data set.

2. The method of claim 1, wherein the generating the first high resolution image comprises generating the first high resolution image by minimizing an image loss function and a kernel loss function.

3. The method of claim 1, wherein the generating the first high resolution image comprises generating the first high resolution image by identifying a blur kernel.

4. The method of claim 1, wherein the generating the second high resolution image comprises generating the second high resolution image by training a generator that performs domain adaptation between the first high resolution image generated by the first machine learning model and a real high resolution image.

5. The method of claim 1, wherein the training the super-resolution network comprises training the super-resolution network to obtain an input low resolution image captured by a user device, and output a high resolution image.

6. A device for training a super-resolution network, the device comprising:
   a memory configured to store instructions; and
   a processor configured to execute the instructions to:
      obtain a low resolution image;
      generate, using a first machine learning model, a first high resolution image based on the low resolution image;
      generate, using a second machine learning model, a second high resolution image based on the first high resolution image and an unpaired dataset of high resolution images, by minimizing an adversarial loss, a cycle loss, and a low-frequency content preservation loss that is defined as a distance between an input and an output of the second machine learning model after passing the input and the output through a low-pass filter;
      obtain a training data set using the low resolution image and the second high resolution image; and
      train the super-resolution network using the training data set.

7. The device of claim 6, wherein the processor is configured to generate the first high resolution image by minimizing an image loss function and a kernel loss function.

8. The device of claim 6, wherein the processor is configured to generate the first high resolution image by identifying a blur kernel.

9. The device of claim 6, wherein the processor is configured to generate the second high resolution image by training a generator that performs domain adaptation between the first high resolution image generated by the first machine learning model and a real high resolution image.

10. The device of claim 6, wherein the first machine learning model is a deep image prior.

11. The device of claim 6, wherein the second machine learning model is a generative adversarial network (GAN).

* * * * *